(12) United States Patent
Milios (10) Patent No.: US 9,812,877 B2
(45) Date of Patent: Nov. 7, 2017

(54) CHARGE REDISTRIBUTION METHOD FOR CELL ARRAYS

(71) Applicant: Sendyne Corporation, New York, NY (US)

(72) Inventor: Ioannis Milios, New York, NY (US)

(73) Assignee: Sendyne Corporation, New York, NY (US)

( * ) Notice: Subject to any disclaimer, the term of this patent is extended or adjusted under 35 U.S.C. 154(b) by 161 days.

(21) Appl. No.: 14/625,270

(22) Filed: Feb. 18, 2015

(65) Prior Publication Data

US 2015/0222133 A1    Aug. 6, 2015

Related U.S. Application Data (60) Continuation of application No. 13/926,057, filed on Jun. 25, 2013, now abandoned, which is a division of application No. 13/510,935, filed as application No. PCT/IB2011/054789 on Oct. 27, 2011, now abandoned.

(60) Provisional application No. 61/408,505, filed on Oct. 29, 2010.

(51) Int. Cl.
  *H02J 7/00* (2006.01)
  *H01M 10/44* (2006.01)

(52) U.S. Cl.
  CPC ......... *H02J 7/0021* (2013.01); *H01M 10/441* (2013.01); *H02J 7/007* (2013.01); *H02J 7/0014* (2013.01)

(58) Field of Classification Search
  None
  See application file for complete search history.

(56) References Cited

U.S. PATENT DOCUMENTS

| 5,710,504 A | 1/1998 | Pascual |
| 6,518,725 B2 | 2/2003 | Marten |
| 7,936,150 B2 | 5/2011 | Milios |
| (Continued) | | |

FOREIGN PATENT DOCUMENTS

| JP | 09-84275 A | 3/1997 |
| JP | 2000-150002 A | 5/2000 |
| (Continued) | | |

OTHER PUBLICATIONS

International Search Report for PCT/IB2011/054789, dated May 15, 2012.
(Continued)

*Primary Examiner* — Alix Eggerding
(74) *Attorney, Agent, or Firm* — Oppedahl Patent Law Firm LLC (57) ABSTRACT

Cell balancing aims to prolong the battery operating life by equalizing the Electro Motive Force (or Open Circuit Voltage) of the participating cells. Even perfectly balanced cells though will exhibit different output voltages because of differences in their internal impedances. The difference in voltage will depend on the load current frequency and intensity. A method is described for re-distributing charge in such a way so when the worst (from the point of view of voltage spread) possible load conditions occur, cells will have similar outputs and none will cross the under-voltage threshold causing a premature shut down of the battery.

5 Claims, 4 Drawing Sheets

(56) References Cited

U.S. PATENT DOCUMENTS

| | | | |
|---|---|---|---|
| 2004/0135546 A1* | 7/2004 | Chertok | B60L 11/185 320/118 |
| 2009/0246631 A1* | 10/2009 | Hojo | H01M 4/1395 429/213 |
| 2009/0325056 A1* | 12/2009 | Greening | G06F 1/189 429/121 |
| 2010/0119881 A1* | 5/2010 | Patel | H01M 2/34 429/7 |
| 2010/0188047 A1 | 7/2010 | Liu | |
| 2010/0247988 A1 | 9/2010 | Okumura | |
| 2012/0119746 A1 | 5/2012 | Macris | |
| 2012/0249052 A1* | 10/2012 | Milios | H01M 10/441 320/106 |
| 2013/0293187 A1* | 11/2013 | Milios | H01M 10/441 320/107 |

FOREIGN PATENT DOCUMENTS

| | | | |
|---|---|---|---|
| JP | 2000-312443 A | | 11/2000 |
| JP | 2007-318950 A | | 12/2007 |
| WO | 2009084821 A3 | | 7/2009 |
| WO | WO 2009/084821 | * | 7/2009 |
| WO | 2012042401 A2 | | 4/2012 |
| WO | 2013095885 A1 | | 6/2013 |

OTHER PUBLICATIONS

Written Opinion of the International Searching Authority for PCT/IB2011/054789, dated May 15, 2012.

* cited by examiner

CHARGE REDISTRIBUTION METHOD FOR CELL ARRAYS

This application claims the benefit of U.S. application No. 61/408,505 filed Oct. 29, 2010, which application is incorporated herein by reference for all purposes.

BACKGROUND

The challenge of balancing individual cells connected in series is a well-known issue in the battery industry. Cells connected in series to form a battery system, even if they were "ideally" manufactured and identically characterized, over time will exhibit deviating electrochemical behavior. These behavioral differences are due, among other reasons, to manufacturing tolerances that get accented over time, but also due to differences in the environment within which each individual cell operates.

There are two major concerns regarding cell imbalance. The first one regards maximizing the charge a battery system can accept. The goal is to achieve 100% SOC for the whole battery system. The second concern regards the ability of the battery to provide the maximum amount of stored charge to the user. In an optimal situation the battery shuts down with minimum residual capacity having provided the maximum amount of its stored energy to the task at hand.

Achieving 100% SOC

In a battery consisting of N number of cells the overall battery $SOC_B$ can be expressed as the sum of the $SOC_n$ of each cell.

$$SOC_B = \frac{1}{N}\sum_{n=1}^{N} SOC_n \qquad (1)$$

Since SOC is closely related to EMF (Electro Motive Force), it is obvious that in order to maximize the SOC of the whole pack, the open circuit voltage Voc of each cell after charging should be at the maximum value allowed by the chemistry and dictated by the operating guidelines of the cell manufacturer. In specific cell chemistries, like Lithium Ion, the charging process is terminated whenever any cell reaches its manufacturer defined maximum voltage. The maximum voltage is set at a value that ensures the battery safety and long term health.

Cells connected in series receive the same amount of charging current. Due to differences in their internal impedance, the cell with the highest impedance will reach the cutoff voltage earlier than other cells, forcing the control electronics to halt the charging process. As a result specific cells may not reach their optimum State of Charge (SOC) and the battery will not perform at its maximum potential. The percentage of SOC that the battery system achieves will depend on the value of the internal impedance, the charging method (pulse, DC, etc.) and the value of the charging current, among other factors.

Figure 1:
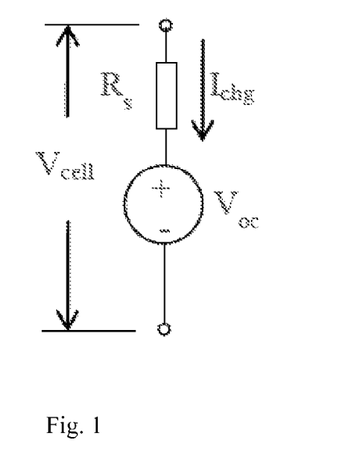
FIG. 1 is an equivalent circuit of a cell being charged with a slowly changing current.
Figure 2:
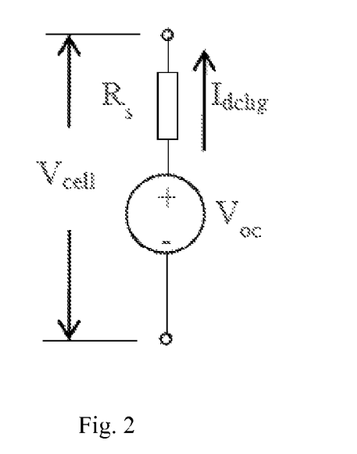
FIG. 2 is an equivalent circuit of a cell being discharged through a constant or slowly varying load.

FIG. 1 shows the equivalent circuit of a battery cell being charged with a slowly changing current. The voltage as measured at the cell terminals $V_{cell}=V_{oc}+I_{chg}R_s$. The $R_s$ value depends among other things on manufacturing variances, aging and cycle history, present SOC and temperature.

Several methods have been proposed to address this challenge. The most commonly used method in the industry today "bleeds" the cell whose $V_{cell}$ value has reached the $V_{MAX}$ value and repeats the process of charging until all cells have reached the $V_{MAX}$ value. The shortcomings of this method are well known and have been referenced in several patents, such as U.S. Pat. No. 5,710,504 "Switched Capacitor System for automatic Battery Equalization" and U.S. Pat. No. 6,518,725 "Charge balancing system". Published Japanese patent application 09-084275 "Method and Apparatus for Controlling Charging of Assembly Battery Pack" introduces a bypass mechanism combined with current reduction at the end of charge in order to avoid overheating cells, with the drawback of prolonged charge time. Sendyne's own U.S. Pat. No. 7,936,150 entitled "Cell protection and conditioning circuit and system" addresses also this same issue proposing a conditioning circuit that takes over charging of individual cells when their $V_{cell}$ value starts approaching their $V_{MAX}$.

Delivering the Stored Charge to the Load

Assuming the battery has been charged optimally, the next and probably most important performance issue is its ability to deliver the stored energy to the active load. If the load is constant or the variation is slow the equivalent circuit looks like the one used for charging with the only difference being the direction of the current.

The voltage in this case as measured at the cell terminals would be:

$$V_{cell}=V_{oc}-I_{dchg}R_s \text{ or}$$

$$V_{cell}=EMF-I_{dchg}R_s \qquad (2)$$

As can be seen in the above equation, cells with the same EMF connected in series can exhibit different terminal voltages $V_{cell}$ depending on the value of their respective internal resistance.

If the load is changing dynamically as in the case of electric vehicles, instead of the internal resistance we can use the internal impedance Z in a similar relationship:

$$V_{cell}=V_{oc}-i_{dchg}Z_s \qquad (3)$$

Figure 3:
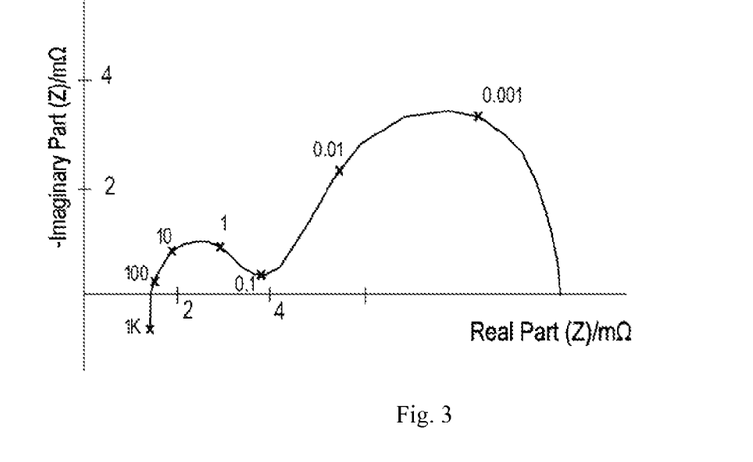
FIG. 3 is a Nyquist representation of LA cell impedance dependence on load signal frequency.

The cell impedance among other factors depends on the frequency content of the load current. A Nyquist representation of the frequency dependence for Lead Acid and LiIon cells is shown in FIGS. 3 and 4.

Figure 4:
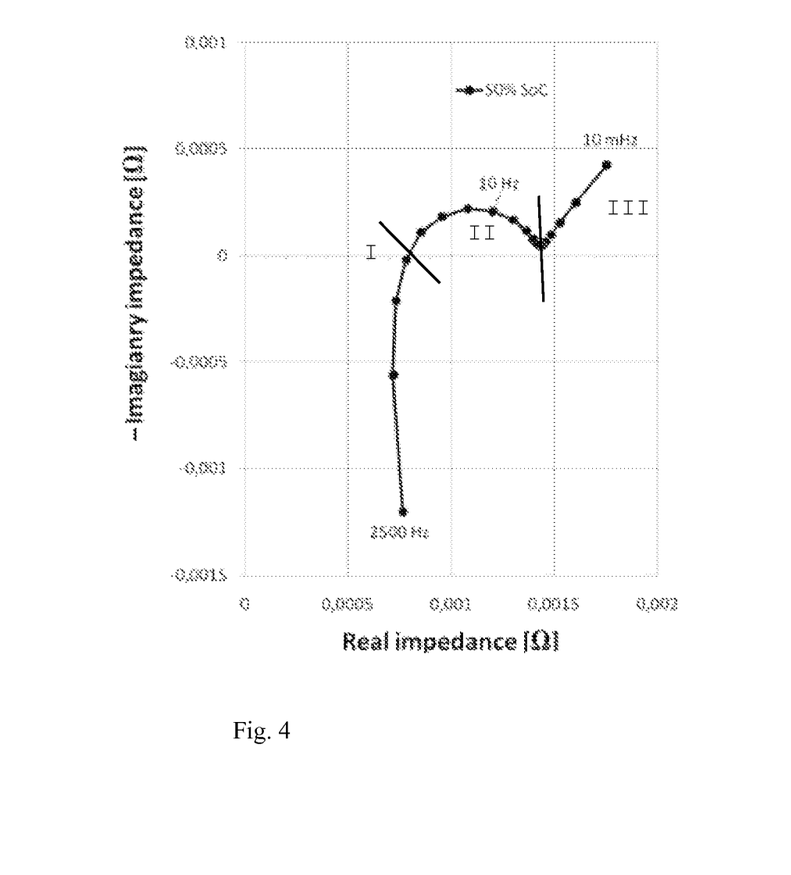
FIG. 4 is a typical Nyquist plot of 40 Ah Li-tec cell, 50% State-of-Charge (SoC)
Figure 5:
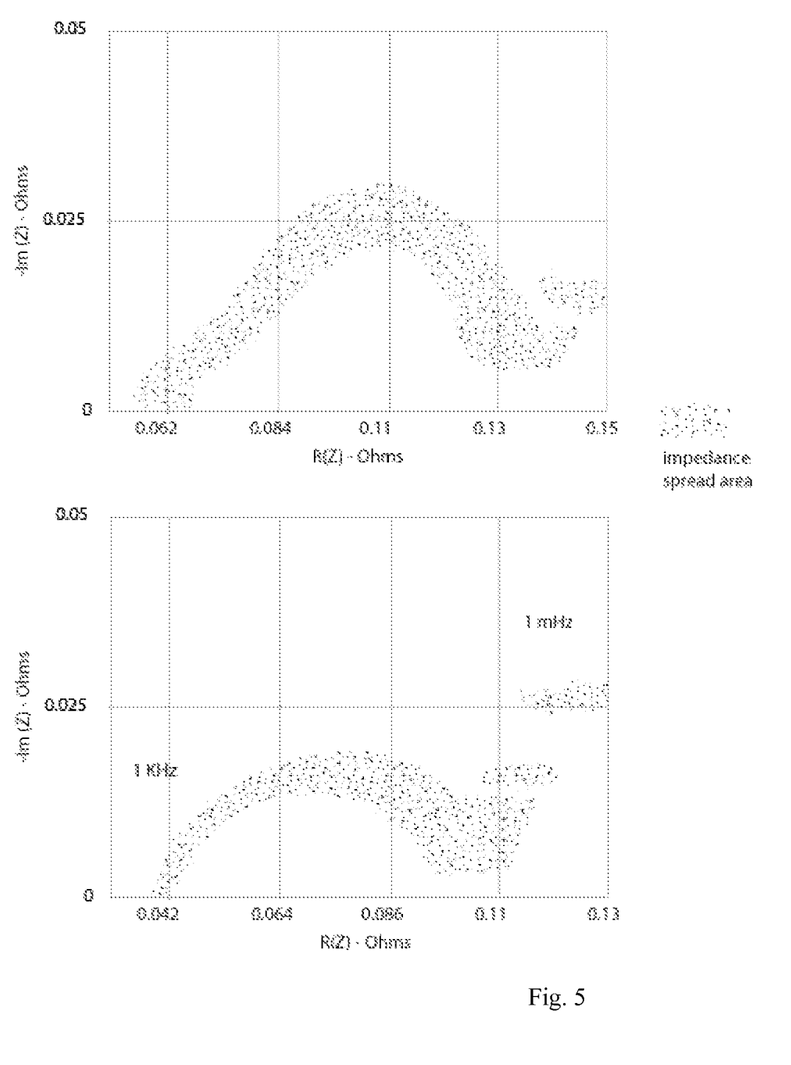
FIG. 5 shows impedance spectra measured at 3.750 V, from 1 kHz to 1 mHz, for 50 new cells from two manufacturers.

The high frequency portion on the left side of FIG. 4 is attributed to conductance of wires, connections, etc., the mid-section semi-circle to charge transfer and the electrochemical double layer, and in general the kinetics of the electrochemical cell reactions. The straight line segment on the right is attributed to limitations in mass charge transfer, also referred to as the diffusion limited part.

It can be appreciated that a dynamic load applied to a battery system will employ, to a different extent, all mechanisms of charge transfer. As a result, cell impedances and resulting cell terminal voltages will vary according to the frequency content of the load current.

The impedance Nyquist plot for each cell varies according to its SOC, temperature, aging and cycle history but also due to manufacturing variances as it is shown on the following figures.

The practical implication is that even if cells participating in a battery system, start with the same SOC and are operating at exactly the same conditions they will still exhibit differences in their internal impedances and the resulting terminal voltages due to manufacturing variances. Because the impedance differences are frequency dependent, the voltage differences among cells will depend on the load current frequencies. As a result, during discharge of a cell array, cells with the highest composite impedance at the specific load frequency spectrum, will reach the cell cutoff voltage first, even if their SOC is not the smallest one in the array.

The alert reader will appreciate that in order to prolong the battery operation, charge should not be distributed equally to every cell as it is the common concept and practice today, but it should be distributed in a manner that boosts the cells with the highest exhibited internal impedance based on the actual load frequency content. So practically in order to prolong battery life cell charge should be actively unbalanced.

Saying the same thing in a different way, while many investigators have expended much energy and ingenuity to attempting to make the charge of each cell as close as possible to being identical to each of the other cells, the invention as will be discussed below actually pursues the very different end of unbalanced cell charge among cells.

A Typical Cell Array

Figure 6:
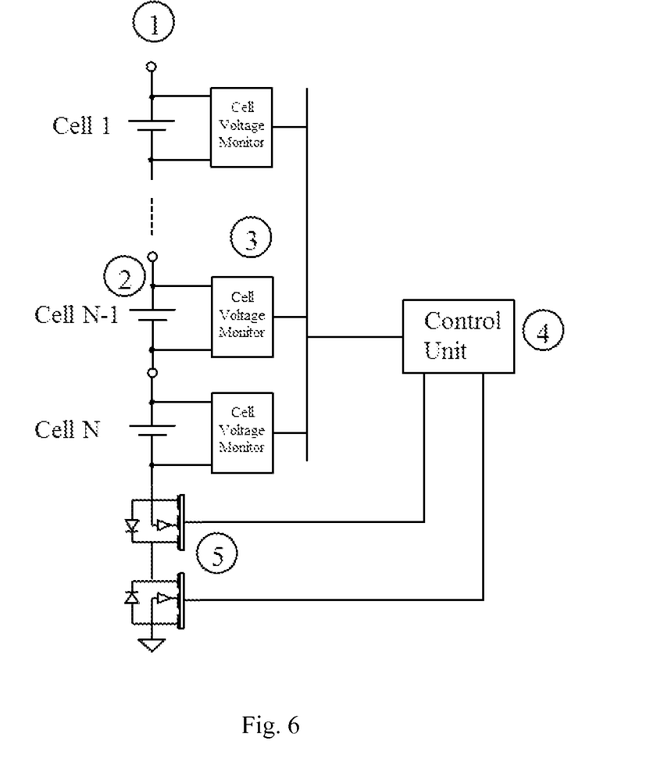
FIG. 6 shows a cell array.

FIG. 6 shows part of a typical battery cell array.

In a typical implementation N-number of cells (2) is connected in series to form a cell-array. The array (1) can form the whole or part of a battery system. The voltage of each cell is monitored typically by a Cell Voltage Monitor circuit (3). Individual cells may have their own voltage monitoring device, or they can time-share one. Among other functions, the "Cell Voltage Monitor" device compares the cell voltage with a set of fixed values specific to the type of cell, a maximum voltage value $V_{OVC}$ (overcharge voltage) and a minimum $V_{UNC}$ (undercharge voltage) value. A control unit (4) controls a set of switches (5) that will selectively open if any of the cell voltages exceeds the $V_{OVC}$ value or becomes lower than the $V_{UNC}$ value. The set of switches is designed in such a way so they will prevent discharging but allow charging if the undercharge voltage is detected and they will prevent further charging while allowing discharging if the overvoltage is detected. The set of protection switches (5) may be one for the whole array as shown in FIG. 6, or one per cell if every cell employs its own protection circuit.

The Issue of Unbalanced Cells and Prior Art

It is appreciated that the first cell whose terminal voltage is detected to reach the $V_{UNC}$ (undercharge voltage) value will force the Control Unit (4) to open the protection switch (5) forcing the cell array to cease providing charge to the load. The cutoff value $V_{UNC}$ is provided by the cell manufacturer and adherence to guarantees that no irreversible damage will occur to the cell, due to super-saturation of the cathode or for other reasons. It is common knowledge in the industry that due to electrochemical differences among the cells, it is likely that not all the cells will reach simultaneously the $V_{UNC}$ (undercharge voltage) value. So when a cell reaches this value, the rest of the cells in the battery array may still have residual charge that is remaining unused. In order to avoid this situation, battery manufacturer employ different methods, such as:

Cell matching. Cells are measured during manufacturing and they are grouped according to their electrical characteristics which may include capacity, internal impedance, etc. so they will exhibit similar behavior under the same load The thermal environment is controlled so all cells in the cell array, operate under the same temperature Cells are "actively balanced", usually during periods of inactivity in order to match their EMF. The goal of balancing is to equate the SOC of all the cells participating in the array, so they hold the same amount of charge.

Batteries are used along with super-capacitors that isolate the load variations from the battery cells.

The Role of Cell Impedance in Battery Pack Performance

When a battery is connected to a dynamic load, such as the load of an electric car, individual cells connected in series within the battery, will exhibit differences in their terminal voltage $V_n$, which is caused by two factors, as it is shown in the following equations:

The difference in their EMF

The difference in their impedance under the specific load $$V_1 = EMF_1 + I_{LOAD} * Z_1$$

$$V_2 = (EMF_1 \pm \Delta EMF) + I_{LOAD} * (Z_1 \pm \Delta Z) \tag{4}$$

Or $$V_2 - V_1 = \pm \Delta EMF \pm I_{LOAD} * \Delta Z \tag{5}$$

From (5) it may be seen that the difference in terminal voltage between two cells depends not only on differences of their respective EMF, but also on the $I_{LOAD}$ current value and the dynamic difference of their internal impedance $\Delta Z$. From (5) it can be appreciated that even if $\Delta EMF=0$, which means the cells are "balanced" (in the traditional sense of the term), they will still exhibit dynamic voltage difference that depending on the current value, and the load, among other things, may cause the cell with the highest impedance to reach first the voltage cutoff value $V_{UNC}$.

SUMMARY OF THE INVENTION

A method for charge redistribution that prolongs battery operation. A dynamic charge re-distribution method is proposed for a cell array of N-cells, where cell voltages $V_1$, $V_2$, . . . , $V_N$ are constantly monitored for variances under load signals of various frequency and intensity. In one implementation, the algorithm may detect the voltage difference between the cell with the highest voltage in the array and the cell with the lowest voltage in the array. In another implementation the supervising circuit may monitor the standard deviation of the distribution of cell voltages. Other algorithms may be used to detect load current frequency and intensity conditions where voltages of individual cells exhibit their widest spread.

When depending on the method employed one of the above conditions is met, the charge stored within the cells is re-distributed in such a way, so the following expression becomes true:

$$EMF_1 - I*Z_1 = EMF_2 - I*Z_2 = \ldots = EMF_n - I*Z_n = \ldots = EMF_N - I*Z_N \tag{6}$$

The goal of the charge re-distribution method is to "boost" proactively the cell with the lowest EMF, highest impedance combination in order to prevent it from triggering an array shutdown condition, as well as achieve optimum power output for the cell array under the specific load conditions.

It should be appreciated that the internal impedance of each cell depends on the cell's EMF so there is no assurance of, let alone a likelihood of, a linear relationship between the charge transfer and the impedance change.

DESCRIPTION OF THE DRAWING

The invention will be described with respect to a drawing in several figures, of which.

DETAILED DESCRIPTION

A first insight is to choose to model each cell not merely with an effective internal resistance but with an effective internal impedance.

If a series array of cells were driving a DC load (for example an incandescent bulb or an array of LEDs) then there is no reason to pay any attention to the imaginary component (if any) of cell impedance.

Impedance, in distinction to a pure ohmic resistance, is dependent among other things on the load frequency. In battery cells, impedance increases significantly in low frequencies. In the case of a cell stack operating under a given load current, cells with the higher impedance will exhibit lower terminal voltage and subsequently lower power output. The same cells will also reach earlier the cutoff voltage, causing the whole battery to cease operation.

A second insight is to appreciate that some loads have a substantial non-DC component. This happens for example in electric and hybrid cars.

A third insight is to appreciate the impedance dependence on the SOC (State-of-charge) of the cell. Impedance among cells varies due to manufacturing tolerances, age, use, etc. During each charge/discharge cycle impedance also changes, so a cell will exhibit a lower impedance when it is in a charged state (high SOC) and a higher impedance when it is in a discharged state (low SOC). Thus charging a cell will result in lowering its impedance.

In specific battery chemistries, such as the Lithium Iron Phosphate ($LiFePO_4$), the change in impedance as related to the SOC, is the most significant indication of the State of Charge, as such cells maintain an almost constant voltage through most of the discharge process.

This prompts us to look not merely at the effective internal resistance of a cell but at the effective internal impedance.

In response to these insights, we choose to infer the Z (effective internal impedance) of each cell. Having worked out which cells have larger Z than others, we then "top up" in a proactive way a cell that has a lower EMF and greater Z as compared with at least one of the other cells in the array.

There is the possibility that two cells with the same EMF will have different internal impedances due to manufacturing variances or/and temperature or/and ageing effects. Charging a cell with a high impedance will again have the effect of lowering its internal impedance which may be desirable in situations where this cell is reaching its cutoff voltage.

It is then helpful to review some possible ways of inferring the impedance Z of a particular cell. It will be appreciated, however, that the teachings of the invention offer their benefits regardless of the particular impedance-inferring approach that is adopted in a particular embodiment.

One example is that you may have an estimate of Voc through another method (Coulomb counting) or direct measurement, which case it is possible to infer Z. What we are really interested in this method is to "force" the revelation of large voltage differences that depend on Z, then use this information to transfer charge so the differences in the frequency operating region of the battery can disappear.

There are at least two methods we can employ to "reveal" Z.

Returning to FIG. 4, we can divide the plotted values into three areas—an area I which is nearly a straight line, an area II which is roughly a half circle, and an area III which extends upwards and to the right in FIG. 4.

One approach to force the cell to reveal its Z is to perform a Fast Fourier Transform (FFT), as well as achieve optimum power output for the cell array under the specific load conditions upon the actual load current I. Since the battery system is not a linear system, and most likely the load variation will fall outside the range of any linear behavior, the FFT can give us only a rough idea of the impedance range. A "high" frequency load signal (some kilohertz, depending on cell technology) will reveal "ohmic" resistance in Area I, which will remain constant (independently of State of Charge or load current or age). A "medium" frequency load signal (in the range of a few Hertz to some kiloHertz) will reveal impedances in Area II (which will depend on State-of-Charge, load current, age, etc.). A "low" frequency signal (mHz/uHz) will reveal impedance in Area III with impedance values changing along the same parameters with Area II.

It is in areas II and III where the impedance dependence on SOC is pronounced, and subsequently voltage differences among cells with differing SOC become apparent. The lower the frequency the more apparent the voltage and SOC difference.

A second method to force the cell to reveal its Z is to impose a small voltage signal (or current) and then measure the current variation (or Voltage). The input signal could be of a single frequency, of multiple frequencies or of a step signal according to the practices used in Electronic Impedance Spectroscopy or in Frequency Response Analyzers. This method may produce more accurate estimates of the impedance at the expenses of greater processing time and greater system complexity.

The chief significance of the plot of FIG. 4 is not so much as a way of arriving at actual impedance values, but as a way of (a) reminding us that the modeled internal impedance is frequency dependent, and (b) giving us a bit of insight as to how much bandwidth we will require our current meter and our voltmeter to be able to analyze. In an exemplary embodiment, we are actually interested more in the lower frequency spectrum than the higher.

Picking the Bandwidth at which to Carry Out Z Measurements

We can determine the bandwidth within which measurements are carried out by the bandwidth the battery system will have to operate within (from signal history data, general experience or theoretical projections). Some economy of effort may be achieved by limiting the measurement bandwidth to some region of bandwidth within which the cells exhibit their maximum impedances. This may be influenced by particular cell chemistry and the topology of the cell structure, among other things.

Optimally Unbalancing a Cell Array

Dynamic balancing involves transfers of charge among cells. Anytime a charge transfer occurs, part of the energy is lost. It is appreciated, that in a battery system the number of such transfers should be minimized When the frequency or the intensity of the load current changes, the equality of (6) achieved through charge redistribution will seize to exist and (7) will be true.

$$EMF_1-I*Z_1 \neq EMF_2-I*Z_2 \neq \ldots \neq EMF_n-I*Z_n \neq \ldots \neq EMF_N-I*Z_N \quad (7)$$

Under the proposed algorithm this fact will not necessarily trigger another charge redistribution process.

The process will be repeated only when the signal frequency and intensity conditions exist to maximize the spread of the cell voltage values (for example a high intensity step signal—such as in acceleration).

It is understood that when the load current becomes zero (for example during a "rest" period), then the $I*Z_x$ terms in (6) become zero and the following becomes true:

$$EMF_1 \neq EMF_2 \ldots \neq EMF_n \ldots \neq EMF_N \quad (8)$$

That is, the Open Circuit Voltage (OCV) of the cells is different and subsequently their SOC is different and the cells are unbalanced, by the classical definition.

Nevertheless, with this method in future load conditions cells will match much closer their output voltages and thus will use their collective energy and power optimally before triggering the under-voltage cutoff mechanism.

Monitoring Individual Cell Impedances and Projecting Future Values

By monitoring cell impedance frequency dependent data, projections can be made regarding the relationship of impedance with each cell's SOC and signal frequency content. Based on these projections charge re-distribution can be performed in a way that ensures that the "weakest" cells (higher impedance, lower EMF), can be boosted to withstand future dynamic loads, specific to the application, without entering the Voltage undercharge region.

What-if Scenarios

Based on load conditions, for example a car maybe driving or being parked, the Battery System Manager processor may make decisions on when and whether to redistribute the charge for compensating either for impedance (driving) or EMF (parked).

Having also the knowledge of the impedance condition of each cell, the BMS can optimize cell charge redistribution either for endurance or for performance.

Finally the BSM can answer "what if" questions regarding future battery performance under different load scenarios.

Charge re-distribution can be implemented either selectively (from some cells to one or more cells) or with the simultaneous participation of all cells.

What has been described, then, is a method for use with a series array of a plurality of electrochemical cells, each cell having a respective state of charge. We measure discharge current during a first measurement interval, said current measurement carried out across a predetermined bandwidth. We measure cell terminal voltage for a first one of the cells during the first measurement interval, said voltage measurement carried out across the predetermined bandwidth. We measure discharge current during a second measurement interval, said current measurement carried out across a predetermined bandwidth. We measure cell terminal voltage for a second one of the cells during the second measurement interval, said voltage measurement carried out across the predetermined bandwidth. We derive information indicative of a respective effective internal impedance for each of the first one of the cells and the second one of the cells, said derived effective internal impedance having not only a pure ohmic component but also a frequency dependent component, said derived effective internal impedance defining a magnitude greater than that of the pure ohmic component taken alone. We derive information indicative of a respective effective internal cell voltage for each of the first one of the cells and the second one of the cells. We identify a particular one of the first one of the cells and the second one of the cells having a lower effective internal cell voltage and a higher magnitude of effective internal impedance. Finally, we top up the state of charge of the identified cell.

In this method, the first measurement interval and the second measurement interval can be the same, in which case the measurements of cell terminal voltage for the first one of the cells and for the second one of the cells are carried out simultaneously by separate voltage measurement devices.

Alternatively, in this method the first measurement interval and the second measurement interval can be one after another, in which case the measurements of cell terminal voltage for the first one of the cells and for the second one of the cells are carried out in turn by a single voltage measurement device multiplexed to the first one of the cells and to the second one of the cells.

In this method, where the measurements are carried out with respect to N cells, N greater than two, it may develop that what is identified is a cell having the lowest effective internal cell voltage and the highest magnitude of effective internal impedance.

Speaking more generally, we may carry out a method that starts with estimating the internal impedance of each of the cells, and identifying a cell with higher impedance than that of at least one other cell, in which case we boost the charge of the identified cell. The outcome is that the boosted cell finishes with a higher EMF than that of the at least one other cell.

Suitable apparatus may be employed to carry out these methods.

The alert reader will have no difficulty devising myriad obvious improvements and variants upon the invention as described and claimed herein. All such obvious improvements and variants are intended to be encompassed within the claims which follow.

The invention claimed is:

1. A method for use with a series array of a plurality of electrochemical cells, each cell having a respective state of charge, the method comprising the steps of:

measuring discharge current during a first measurement interval, said current measurement during the first measurement interval carried out across a predetermined bandwidth;

measuring cell terminal voltage for a first one of the cells during the first measurement interval, said voltage measurement during the first measurement interval carried out across the predetermined bandwidth;

measuring discharge current during a second measurement interval, said current measurement during the second measurement interval carried out across a predetermined bandwidth;

measuring cell terminal voltage for a second one of the cells during the second measurement interval, said voltage measurement during the second measurement interval carried out across the predetermined bandwidth;

deriving information indicative of a respective effective internal impedance for each of the first one of the cells and the second one of the cells, said derived effective internal impedance having not only a pure ohmic component but also frequency dependent component, said derived effective internal impedance defining a magnitude greater than that of the pure ohmic component taken alone;

deriving information indicative of a respective effective internal cell voltage for each of the first one of the cells and the second one of the cells;

monitoring a signal frequency of a load current delivered by the series array of a plurality of electrochemical cells to a load;

determining a relationship between the signal frequency of the load current and the respective state of charge of each cell, and thereby identifying a particular one of the first one of the cells and the second one of the cells having a lower effective internal cell voltage and a higher magnitude of effective internal impedance; and topping up the state of charge of the identified cell.

2. The method of claim 1 wherein the first measurement interval and the second measurement interval are the same, and wherein the measurements of cell terminal voltage for the first one of the cells and for the second one of the cells are carried out simultaneously by separate voltage measurement devices.

3. The method of claim 1 wherein the first measurement interval and the second measurement interval are one after another, and wherein the measurements of cell terminal voltage for the first one of the cells and for the second one of the cells are carried out in turn by a single voltage measurement device multiplexed to the first one of the cells and to the second one of the cells.

4. The method of claim 1 wherein the measurements are carried out with respect to N cells.

5. Apparatus for use with a series array of a plurality of electrochemical cells, each cell having a respective state of charge, the apparatus comprising:

means measuring discharge current during a first measurement interval, said current measurement during the first measurement interval carried out across a predetermined bandwidth;

means measuring cell terminal voltage for a first one of the cells during the first measurement interval, said voltage measurement during the first measurement interval carried out across the predetermined bandwidth;

means measuring discharge current during a second measurement interval, said current measurement during the second measurement interval carried out across a predetermined bandwidth;

means measuring cell terminal voltage for a second one of the cells during the second measurement interval, said voltage measurement during the second measurement interval carried out across the predetermined bandwidth;

means deriving information indicative of a respective effective internal impedance for each of the first one of the cells and the second one of the cells, said derived effective internal impedance having not only a pure ohmic component but also a frequency dependent component, said derived effective internal impedance defining a magnitude greater than that of the pure ohmic component taken alone;

means deriving information indicative of a respective effective internal cell voltage for each of the first one of the cells and the second one of the cells;

means monitoring a signal frequency of a load current delivered by the series array of a plurality of electrochemical cells to a load;

means determining a relationship between the signal frequency of the load current and the respective state of charge of each cell, and thereby identifying a particular one of the first one of the cells and the second one of the cells having a lower effective internal cell voltage and a higher magnitude of effective internal impedance; and means topping up the state of charge of the identified cell.

* * * * *